(12) United States Patent
Gibard

(10) Patent No.: US 6,294,886 B1
(45) Date of Patent: Sep. 25, 2001

(54) SUPPLY SYSTEM FOR AN ELECTRIC TRACTION VEHICLE

(75) Inventor: Philippe Gibard, La Rochelle (FR)

(73) Assignee: Alstom France SA, Paris (FR)

( * ) Notice: Subject to any disclaimer, the term of this patent is extended or adjusted under 35 U.S.C. 154(b) by 0 days.

(21) Appl. No.: 09/384,979

(22) Filed: Aug. 30, 1999

(30) Foreign Application Priority Data

Aug. 28, 1998 (FR) .................................................. 98 10830

(51) Int. Cl.$^7$ ....................................................... H02K 7/02
(52) U.S. Cl. .......................... 318/161; 318/139; 318/150; 180/65.3
(58) Field of Search ..................................... 318/150, 140, 318/139, 325, 326, 382, 161; 180/65.2, 65.3

(56) References Cited

U.S. PATENT DOCUMENTS

| Re. 29,994 | * | 5/1979 | Bossi ........................................... 191/2 |
| 4,095,154 | * | 6/1978 | Williamson ............................. 318/376 |
| 4,096,423 | * | 6/1978 | Bailey et al. ........................... 318/370 |
| 4,148,260 | * | 4/1979 | Minovitch ......................... 104/138 R |
| 5,492,192 | * | 2/1996 | Brooks et al. ......................... 180/165 |
| 5,735,215 | * | 4/1998 | Tegeler ................................ 105/34.1 |
| 5,767,591 | * | 6/1998 | Pinkerton ............................... 307/64 |
| 5,773,962 | * | 6/1998 | Nor ....................................... 320/134 |
| 5,929,595 | * | 7/1999 | Lyons et al. .......................... 320/104 |
| 5,932,935 | * | 8/1999 | Clifton et al. ........................... 307/60 |
| 6,020,657 | * | 2/2000 | Liran ....................................... 307/64 |

FOREIGN PATENT DOCUMENTS

| 2 405 198 | 8/1974 | (DE) . |
| 31 01 655 | 12/1981 | (DE) . |
| 2 756 118 | 5/1998 | (FR) . |

OTHER PUBLICATIONS by Schaible et al., "A Torque Controlled High Speed Flywheel Energy Storage System for Peak Power Transfer in Electric Vehicles", Conference Record of the Industry Applicatons Conference, vol. 1, No. Conf. 29, Oct. 1994.

* cited by examiner

Primary Examiner—Robert E. Nappi
Assistant Examiner—Rita Leykin
(74) Attorney, Agent, or Firm—Young & Thompson

(57) ABSTRACT

Supply system for an electric traction vehicle equipped with electric traction motors (M1 to M4) supplied by a traction system and pantograph means (2) for connecting the traction system (1) to a catenary (3), characterized in that it furthermore comprises in combination, an autonomous supply device carried on board a vehicle and including a kinetic accumulation of energy system (5) having a rotating machine with rotor forming a flywheel and operating either as a motor, or as a generator, means (2, 18) for connecting the kinetic accumulation of energy system (5) in the charging regime to the mains supply during stoppages of the vehicle in stations, and in the discharging regime, to the traction system (1), the said kinetic accumulation of energy system (5) being a system for recovering the braking energy of the vehicle.

4 Claims, 4 Drawing Sheets

SUPPLY SYSTEM FOR AN ELECTRIC TRACTION VEHICLE

The present invention relates to the supplying of electrical energy to electric traction public transport vehicles and concerns more particularly the supplying of electrical energy to trams.

Given the increase in urban traffic, it is becoming necessary to be able to run public transport vehicles such as high-capacity trams of up to 30 to 40 m in length and to do so without employing a catenary-based supply, in particular in town centres crammed with amenities of all sorts, whilst guaranteeing them commercial speeds and performance levels which are compatible with the requirements of transport systems.

To date, no solution is known to the problem of the autonomy of large-gauge trams with respect to the catenary.

Solutions which favour the autonomous running, with no catenary, of electric vehicles relate only to small vehicles of low capacity and mass, of the order of 30 tonnes.

There are systems for the continuous pick-up of electrical energy via the ground but these systems pose difficult and expensive civil engineering and safety problems.

The invention aims to remedy the drawbacks of the prior art devices by creating a system for supplying electrical energy to an autonomous tram of high capacity which allies simplicity of design with reasonable cost price and relative ease of installation.

Its subject is a supply system for an electric traction vehicle equipped with electric traction motors supplied by a traction system and pantograph means for connecting the traction system to a catenary, characterized in that it furthermore comprises in combination, an autonomous supply device carried on board a vehicle and including a kinetic accumulation of energy system having a rotating machine with rotor forming a flywheel and operating either as a motor, or as a generator, means for connecting the kinetic accumulation of energy system in the charging regime to the mains supply during stoppages of the vehicle in stations, and in the discharging regime, to the traction system, the said kinetic accumulation of energy system being a system for recovering the braking energy of the vehicle.

According to other characteristics of the invention:

the autonomous supply device furthermore comprises a backup reserve system which can be linked to the mains with a view to its recharging or to the traction system with a view to the supplying of the latter in degraded mode, and including a traction battery and a charger of the said battery from the mains, and means for switching the backup reserve system, either over to the traction system or over to the mains;

the supply system furthermore comprises, in each station, a contact wire for supplying the kinetic accumulation of energy system from the mains by way of the said means for connecting the traction system to the catenary;

the supply system furthermore comprises means for controlling the pantograph connection means with a view to placing them in contact with the contact wire as soon as the vehicle arrives in a station and means for controlling withdrawal of the pantograph connection means with respect to the contact wire when the vehicle leaves the station;

the supply system comprises means for managing the energy of the kinetic accumulation of energy system with a view to enabling the vehicle to make best use of the energy of the said system so as to enable it to make its journey between rechargings from the high voltage mains in two successive stations, a sensor of the current drawn by the kinetic accumulation of energy system and fed to the traction system, tachometer means for determining the speed of rotation of at least two electric traction motors of the vehicle and the distance travelled by the vehicle and a sensor of the speed of the flywheel of the rotating machine of the kinetic accumulation of energy system being associated with the said management means;

the said management means comprise an on-board central computer linked by an on-board computerized network to an electronic control circuit of the traction system and an electronic control circuit of the kinetic accumulation of energy system;

the on-board central computer of the vehicle contains speed values corresponding to energies remaining to be provided until the next stoppage of the vehicle in a station, the said energy values being intended to be compared with the energy still available in the kinetic accumulation of energy system so as to deliver, to the traction system, speed limitation preset instructions when the vehicle is in the traction state;

the electronic control circuit of the kinetic accumulation of energy means comprises means for actuating the means for switching the backup reserve system over to the traction system when the energy available in the kinetic accumulation of energy system reaches a predetermined minimum value below which the kinetic accumulation of energy system is no longer rechargeable in-station in the course of a normal duration of stoppage.

The invention will be better understood with the aid of the description which follows, given merely by way of example and whilst referring to the appended drawings in which.

To solve the problem of supplying electrical energy to a vehicle which has to travel over a route in autonomous mode for the most part, the Applicant has envisaged the following solutions:

rapid recharging, during stoppages of the vehicle in stations, of a kinetic energy accumulation system;

recovery of the braking energy of the vehicle, optimal reuse in autonomous mode of the basic constituents of the tram such as pantographs, traction equipment, motors, etc, electronic management of the energy on board the vehicle with active control of consumption in battery backup mode, running in conventional mode by catenary energy pickup, outside the urban zone.

Figure 1:
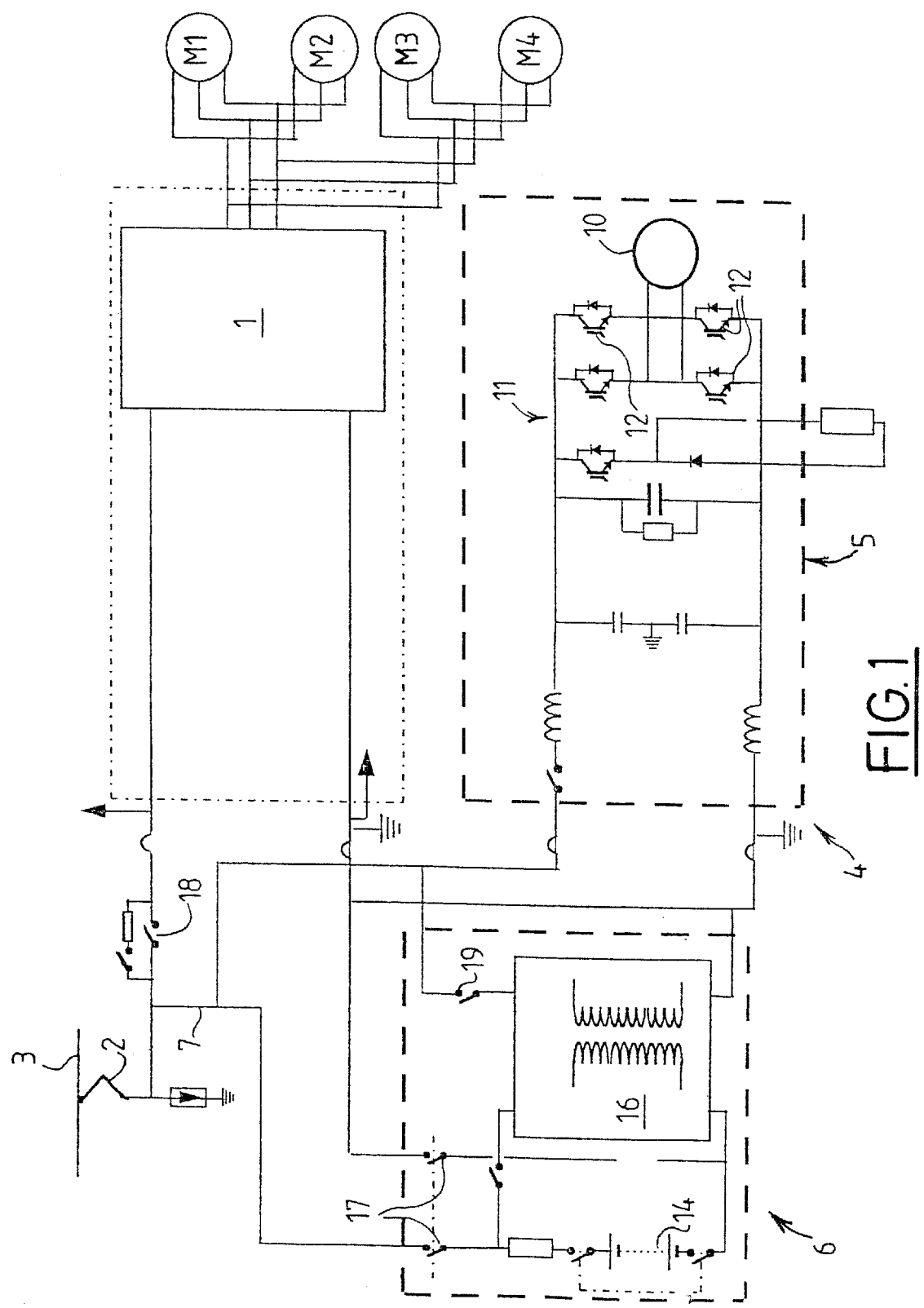
FIG. 1 is an electrical diagram of the power circuit of the electrical energy supply device for a tram according to the invention.

Represented in FIG. 1 is the diagram of the power circuit of an autonomous tram combining a number of the solutions listed above.

This circuit comprises a traction system 1 supplying motors M1, M2, M3, M4 for driving the wheels of the vehicle.

The traction system 1 is supplied on the one hand in the conventional regime by a pantograph 2 from a catenary 3 and on the other hand, in the autonomous regime by an autonomous supply device carried on board the vehicle and labelled with the general numerical reference 4.

The on-board device 4 comprises a kinetic accumulation of energy system 5 and a backup reserve system 6, both connected to a common point 7 together with the pantograph 2 for transmitting supply energy from the catenary 3.

The kinetic accumulation of energy system 5 comprises a polyphase synchronous motor 10 with permanent magnets whose rotor is, in a manner known per se, disposed outside and acts as an inertial mass.

This motor is associated with a variable-frequency electronic supply device 11 which makes it possible to regulate a fixed voltage as a function of the speed of the motor 10. The supplying of one phase of the motor 10 with the aid of an IGBT transistor bridge 12 is represented in FIG. 1.

In the recharging regime, the mass of the rotor of the motor 10 is driven at a high speed.

In the discharging regime, the motor functions as a generator and provides the traction system 1 with energy.

The supply voltage of the kinetic accumulation of energy system on the high voltage network is fixed at a value of between 700 V and 800 V, thus enabling the traction system 1 to function in an identical manner whether it be supplied via the catenary (typical voltage of 750 V) or via the kinetic accumulation of energy system 5.

This makes it possible in particular:

to guarantee the vehicles good performance levels in autonomous mode;

to switch readily between catenary supply and supply via the kinetic accumulation of energy system 5 without employing any electronic system for voltage conversion or any electromagnetic connecting member;

a high recharging capacity of the kinetic accumulation of energy system 5 based on the braking energy recovered from the traction system 1.

The backup reserve system 6 comprises a traction battery 14 with which is associated a charger 16 connected to the pantograph 2 so as to link it either to the catenary 3, or to an outside supply circuit which will be described with reference to FIG. 2.

The backup reserve system 6 can be connected by circuit breakers 17 in combination with a circuit breaker 18, to the traction system 1.

It can also be connected by way of a circuit breaker 19 to the mains supply 3 so as to charge the traction battery 14.

A connection 20 enables the traction system 1 to be supplied by the system 5 with kinetic accumulation of energy.

Figure 2:
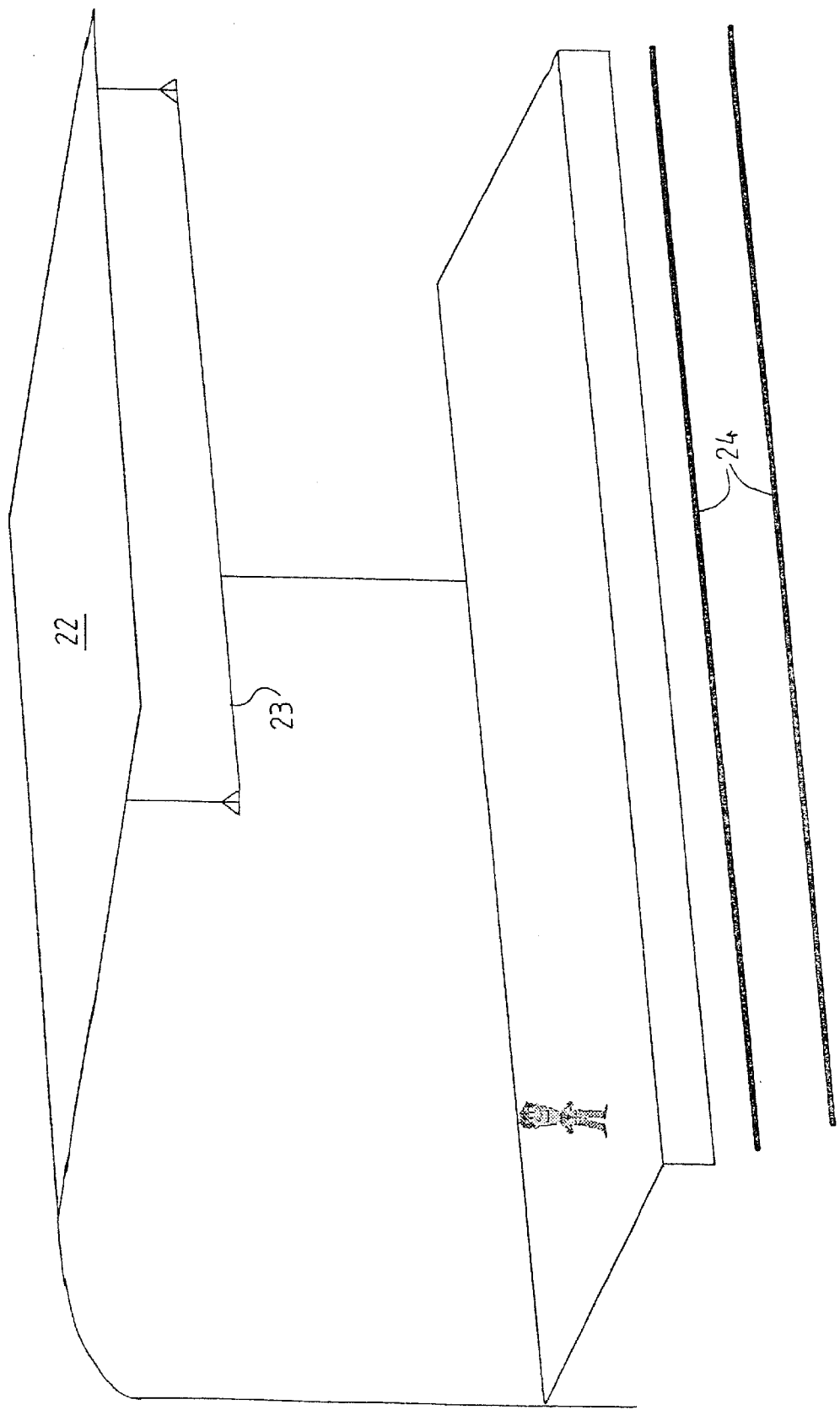
FIG. 2 is a diagrammatic view of a tram stop comprising means for supplying electrical energy to the rechargeable means disposed on board the vehicle.

Represented diagrammatically in FIG. 2 is a stopping station for a tram equipped with the supply system of the invention. This station comprises a canopy 22 which carries a contact wire 23 located above the track 24 and supplied by the high voltage mains, this wire being intended to cooperate with the pantograph 2 of the tram so as to recharge the kinetic accumulation of energy system 5 and the backup reserve system 6 while the tram has stopped in the station.

The novelty of this architecture lies in particular in the fact that in autonomous mode, the kinetic accumulation of energy system 5 provides the auxiliary equipment of the tram and the traction system 1 with energy by itself. There is no additional thermal, electrochemical or electrical energy in parallel with the kinetic accumulation of energy system. However, this can be achieved with a sufficient level of performance and reliability only if the following arrangements are provided for:

recharging of the energy accumulation system 5 in stations. The principle of recharging is described below through simple pick-up and civil engineering arrangements in stations.

real-time management of the energy available as described below. This management makes it possible to optimise the performance of the autonomous mode in relation to the consumption profile imposed by the line and by the manner of driving. Moreover, the backup reserve system 6 makes it possible, in the extreme cases of discharging of the kinetic accumulation of energy system 5, for the vehicle to run in degraded mode at reduced speed (typically 25 km/h) until the next station or a zone with overhead catenary.

The sequencing of the manner of operation is as follows: the moving of the vehicle from a zone with overhead catenary to a zone under autonomy will be given by way of example.

1) By order of the driver when stopping in the station (FIG. 2), the pantograph 2 is lowered by a conventional control device (not represented), the auxiliary equipment goes over to reduced power and is supplied by a kinetic accumulation of energy system 5 which switches into an energy generator.

2) By order of the traction system 1, the kinetic accumulation of energy system 5 then provides the necessary power, thereby enabling the vehicle to start up and gather speed; during braking, the traction system 1 sends energy to the kinetic accumulation of energy system 5.

3) Should it be necessary to resume traction, or in the event of untimely stoppages imposed by the manner of driving or by the line, the consumption on the kinetic accumulation of energy system 5 increases substantially; energy management which will be described with reference to FIG. 3 therefore enables this consumption to be limited by optimising the traction performance of the vehicle whilst guaranteeing it sufficient energy to reach a next station.

4) At the next station, the pantograph 2 is raised and energy pick-up is effective in a minimal time, thus allowing the recharging of the kinetic accumulation of energy system 5 and the supplying at maximum power of the auxiliaries of the vehicle via the contact wire 23 (FIG. 2).

The voltage levels delivered by the kinetic accumulation of energy system 5, the catenary 3 and the contact wire 23 are compatible, thus allowing ready switchings of these sources with respect to the user-end loads.

The performance of the system according to the invention in autonomous mode is as follows:

Over a typical journey of 500 m between two stations, for a maximum speed of between 50 and 60 km/h, calculations show that, by braking, it is possible to recover of the order of 30 to 40% of the energy consumed under traction. The additional energy is then readily recoverable through the recharging performance of the kinetic accumulation of energy system 5 whilst stopping at a station for a typical duration of 15 to 20 s depending on the level of discharge.

This performance makes it possible to do away with the catenary over new tram lines, in particular in town centres where the speed is generally limited to 50 km/h; the catenary is then necessary only for particular profiles of line with considerable slopes, or in extraurban zones with considerable lengths between stations or requiring high maximum speeds.

Energy is picked up in the station as follows.

The principle of in-station pick-up is identical to that with overhead catenary. The pantograph 2 is again used and pick-up is performed by the wire 23 located at a minimum height (typically 3.60 m to 4 m) under the canopy 22 of the station.

This wire may be flexible or rigid and built into the architecture and planning of the stations as represented in FIG. 2.

This solution poses no specific safety problem since it is identical to catenary pick-up.

To minimise the rise time of the pantograph 2 on arriving in the station, it is conceivable to use the beacons for aiding operations disposed at the entrance to each station, and whose detection by the vehicle would issue the command to raise the pantograph 2.

The pantograph is lowered by order of the go command from the driver, vehicle start-up is delayed and is effective only when the pantograph 2 down cue is returned.

The rise and fall time of the pantograph at this pick-up height is of the order of 1 s.

As indicated earlier, the correct functioning of the system according to the invention is conditioned by rigorous management of the energy available.

Figure 3:
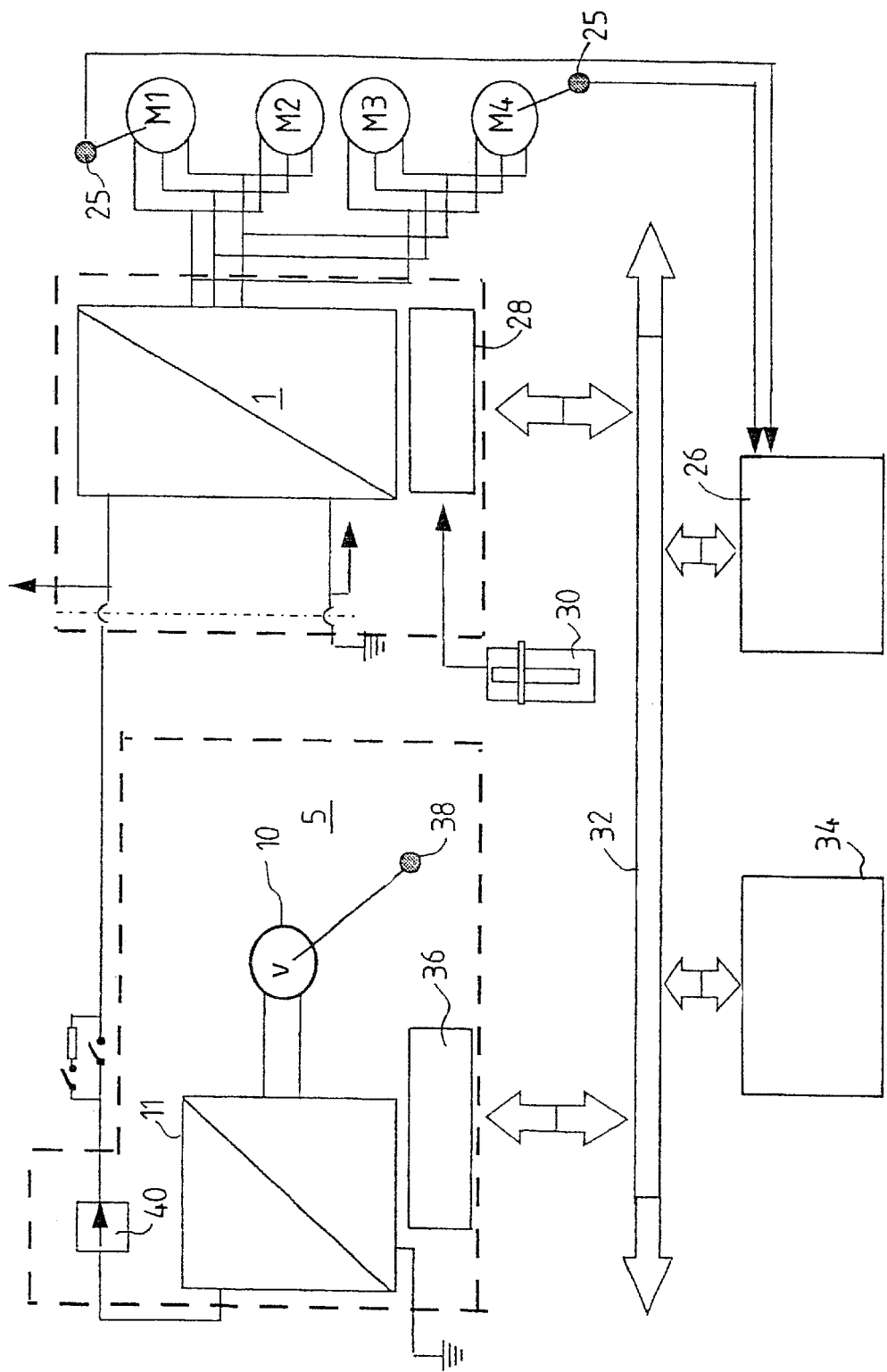
FIG. 3 is a diagrammatic view of the system for managing the energy for supplying the tram.

FIG. 3 diagrammatically represents the management means implemented within the supply system according to the invention.

These management means comprise sensors 25 of the speed of rotation of two of the traction motors M1 to M4, connected to a tachometer rig 26.

Moreover, associated with the traction system is an electronic control circuit 28 which is linked on the one hand to a driving handle 30 and on the other hand to an on-board computerized network 32 from which it receives speed presets.

The on-board computerized network 32 is linked to an on-board central computer 34 and to the tachometer rig 26.

It is moreover linked up to an electronic control circuit 36 associated with the kinetic accumulation of energy system 5 whose rotating machine 10 is linked to a flywheel speed sensor 38.

A current sensor 40 is connected in the line linking the kinetic accumulation of energy system 5 to the traction system 1.

The management of the energy of the system according to the invention is carried out as follows.

The kinetic accumulation of energy system 5 delivers or consumes power P proportional to its speed of rotation $\Omega$, $P = k_1 \Omega$.

The total energy E stored up in the kinetic accumulation of energy system 5 is proportional to a moment of inertia, i.e. $E = k_2 \Omega^2$.

At every point of speed $\Omega$, control of the energy of the kinetic accumulation of energy system is therefore performed in a plane (power, energy) with, for each speed variation $\Delta\Omega$, a power variation $\Delta P = k_1 \Delta\Omega$ and an energy variation $\Delta E = k_2 \Delta\Omega^2$.

It will be observed that the representation of the energy consumed as a function of the instantaneous power takes the form of a parabola passing through the point of maximum power Pm for maximum energy Em and for the maximum speed of rotation $\Omega m$ of the kinetic accumulation of energy system.

For ease of measurement, as well as greater accuracy, the energy measurement is made by measuring the current I consumed or recovered by the kinetic accumulation of energy system (depending on its sign), since the kinetic accumulation of energy system regulates a constant voltage within a very wide range of rotation, this signifying that the current I is proportional to the power P.

This measurement is made by the electronic control circuit 36 of the kinetic accumulation of energy system associated with the current sensor 40 and which calculates by integration over a sampling interval, the energy consumed and the energy remaining, also taking the corresponding values of efficiencies into account in this calculation.

The charting of the vehicle over the journey is carried out as follows.

The tram possesses, in a conventional manner, speed-measuring equipment (tachometer rig 26), which receives the measurements of the speed of two of the traction motors M1 and M4 and derives therefrom a value of reference speed of the vehicle, as well as a value of distance travelled from a given instant (odometer function); this enables the central computer 34 of the vehicle to know its actual position along the journey (inter-station gap and position in the inter-station gap).

It is also possible to log the position of the vehicle via radio beacons (not represented) located at various points along the journey; these arrangements are optional but in general are conventionally present in modern lines to aid operations.

The energy consumption under the nominal tram driving and operating conditions over the gaps between each pair of stations is measured in a phase of preliminary trials over the line for various maximum speeds and is stored in the central computer 34 of each vehicle.

For each gap between stations and at every point given by a distance interval pk of the order of the length of the vehicle (30 to 40 m), the on-board central computer 34 therefore knows the nominal energy consumptions to be provided E (v, pk) for various maximum speeds v, until the next stop at a station.

When, under traction and over at least two distance intervals, the central computer 34 detects an overconsumption in the kinetic accumulation of energy system (adjustable threshold of the order of 20% of overconsumption for example), it searches the consumption table in its memory for the speed value v=Vr for which the energy remaining to be provided until the next stoppage in a station (by integrating the braking) is immediately less than a limit threshold calculated so as to be able to recharge the flywheel during the scheduled stoppage time for this station.

This speed value Vr is then output by the on-board computer 34 to the traction system 1 which applies this speed limitation preset when the driving handle 30 is in the traction position; a speed reduction indication is also output in the cabin for the driver.

During braking, this reduction is disallowed so as to maximize the recovery of energy.

When the reduction in speed is too considerable or when the speed sensor 38 of the kinetic accumulation of energy system detects a minimum speed threshold of the flywheel of the motor 10, the kinetic accumulation of energy system then regulates a lower output voltage so as to match this voltage to the voltage of the backup reserve system 6 hitherto saved; an automatic switch is then made over to this backup system 6 by the electronic control circuit 36 which closes the circuit breakers 17 (FIG. 1).

The battery system 14 allows the vehicle to run in degraded mode at reduced speed (typically 25 km/h) until the next stop at a station; this mode is an exceptional mode and the battery 14 experiences little demand in terms of number of cycles and hence lifetime.

The battery system is recharged by a specific charger in the depot or from the catenary 3 when the vehicle is travelling in zones where the line has a catenary (FIG. 1).

Figure 4:
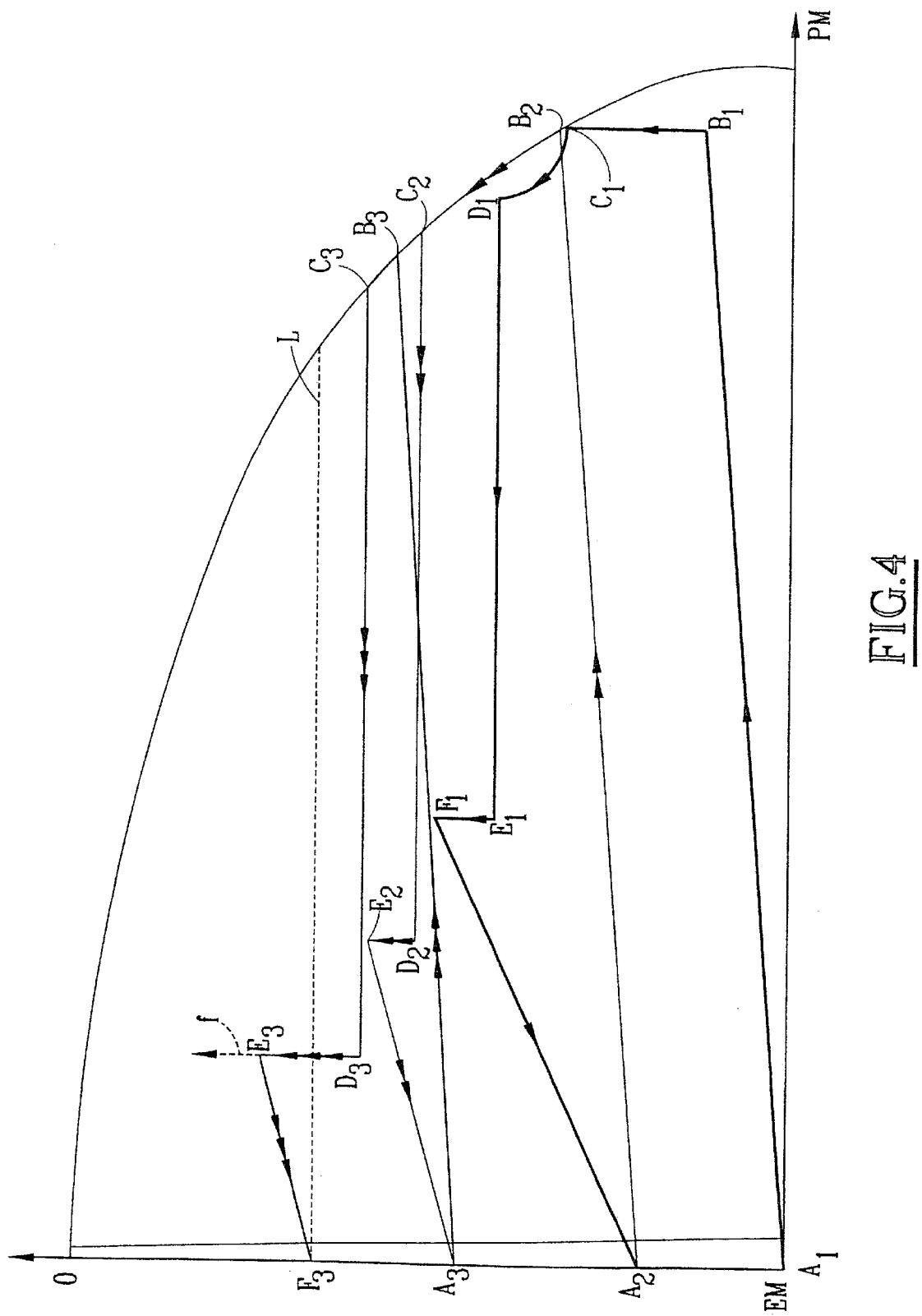
FIG. 4 is a graph representing the management of the power consumed in the flywheel of the kinetic recovery of energy system.

The principle of active control of energy is represented diagrammatically in FIG. 4 through the following example of an inter-station gap.

The first start-up and the first journey until the vehicle stops is represented by a loop designated by single arrows.

The total power consumed is less than the maximum power available in the kinetic accumulation of energy system 5.

During this first cycle, the speed reaches a maximum value at the point $E_1$, and is then maintained at this value during the stretch $E_1F_1$. During the stretch $F_1A_2$, braking with energy recovery occurs.

The second start-up and the second journey until the next stoppage of the vehicle is represented by a loop $A_2B_2C_2D_2E_2A_3$ designated by double arrows.

The power consumed is regulated by the traction system at the limit of the maximum characteristic of the kinetic accumulation of energy system 5; during the traction phase, the central computer 24 measures an overconsumption in the kinetic accumulation of energy system 5 in relation to the consumption profile stored for this inter-station gap; a reduction in speed is therefore imposed on the vehicle.

During the stretch $B_2C_2$, the speed increases but cannot be maintained at the maximum speed so that during the stretch $B_2C_2$, the energy consumed, compared with an energy template, is controlled by reducing the speed preset.

During the stretch $C_2D_2$, a new speed plateau is reached. This speed below the speed during the plateau $E_1F_1$ is maintained during the plateau $D_2E_2$.

Next, during the stretch $E_2A_3$, braking with energy recovery occurs until the vehicle stops.

The third start-up is assumed to be unplanned, and hence brings about an overconsumption with maximum speed reduction.

The third start-up and the third journey up to the stop are represented by the loop $A_3B_3C_3D_3E_3F_3$ designated by triple arrows.

During the stretch $A_3B_3$, the vehicle goes from rest to a maximum speed compatible with the remaining energy available in the kinetic accumulation of energy system 5.

During the stretch $B_3C_3$, there is again reduction of the preset speed and during the stretch $C_3D_3$, the speed of the vehicle proceeds towards a plateau which is maintained during the stretch $D_3E_3$.

It may be seen that during this plateau, the limit zone of discharge of the flywheel 10 (FIG. 1), indicated by the horizontal dotted line L, is overstepped.

However, braking during the stretch $E_3F_3$ effects recovery of energy which when the vehicle stops at the point $F_3$ brings the energy available back to the limit of discharge of the flywheel, so that if the stoppage at the point $F_3$ is at a station which has charging means, the flywheel 10 of the motor can be reactivated so as to reach a sufficient energy during the time the vehicle is stationary, enabling it to continue its journey normally.

If, on the contrary, the speed plateau extends beyond the stretch $D_3E_3$, as indicated by the dotted arrow F, there is a switchover to the backup reserve system 6 which enables the traction system 1 to be supplied in such a way that the tram can get to the next station in the degraded regime with a speed of the order of 25 km/h.

This switchover is catered for by the electronic control circuit 36 which closes the circuit breakers 17 (FIG. 1).

By virtue of the layout just described, the supply system for electric traction vehicle enables the vehicle to exhibit performance levels which are very well suited to urban journeys.

Moreover, the cost of such a system is relatively small in relation to the performance levels obtained, whilst its safety and reliability are noteworthy.

What is claimed is:

1. Supply system for an electric traction vehicle comprising:

electric traction motors supplied by a traction system and pantograph means (2) for connecting the traction system to a catenary;

an autonomous supply device carried on board the vehicle comprising:
 a kinetic accumulation of energy system having a rotating machine with a rotor forming a flywheel operable either as a motor or as a generator; and
 a backup reserve system which can be selectably connected either to a main electrical supply to allow recharging of the backup reserve system or to the traction system to supply power to the traction system in a degraded mode, the backup reserve system comprising a traction battery, a charger adapted to charge the traction battery from the main electrical supply, and means for switching the backup reserve system to one of the main electrical supply and the traction system; and means for connecting the kinetic accumulation of energy system during charging to the main electrical supply during stoppages of the vehicle in stations, and for connecting the kinetic accumulation of energy system to the traction system during discharging;

wherein said kinetic accumulation of energy system is a system for recovering braking energy of the vehicle, said supply system further comprising:
 means for managing energy of the kinetic accumulation of energy system to enable the vehicle to make best use of the energy of said system so as to enable the vehicle to travel between recharging from the main electrical supply in two successive stations,
 a sensor of current drawn by the kinetic accumulation of energy system and fed to the traction system,
 tachometer means for determining a speed of rotation of at least two of the electric traction motors of the vehicle and a distance traveled by the vehicle, and
 a sensor of the speed of the flywheel of the rotating machine of the kinetic accumulation of energy system associated with said management means;

wherein said management means comprises an on-board central computer linked by an on-board computerized network to an electronic control circuit of the traction system and an electronic control circuit of the kinetic accumulation of energy system;

wherein the on-board central computer of the vehicle contains speed values corresponding to amounts of energy remaining to be provided until a next stoppage of the vehicle in a station, said energy values being compared with energy still available in the kinetic accumulation of energy system so as to deliver, to the traction system, speed limitation preset instructions when the vehicle is in the traction state.

2. Supply system according to claim 1, further comprising, in each said station, a contact wire for supplying the kinetic accumulation of energy system from the main electrical supply by way of said means for connecting the traction system to the catenary.

3. Supply system according to claim 2, further comprising a means for controlling the pantograph connection means to place it in contact with the contact wire as soon as the vehicle arrives in a station and means for controlling withdrawal of the pantograph connection means with respect to the contact wire when the vehicle leaves the station.

4. Supply system according to claim 1, wherein the electronic control circuit of the kinetic accumulation of energy means comprises means for actuating the means for switching the backup reserve system over to the traction system when the energy available in the kinetic accumulation of energy system reaches a predetermined minimum value below which the kinetic accumulation of energy system is no longer rechargeable in-station during a normal duration of stoppage.

* * * * *